Dec. 24, 1963    W. E. JAMES    3,115,396
DRYER UNIT AND ERECTING MECHANISM
Filed March 21, 1961    2 Sheets-Sheet 1

INVENTOR.
WILLIAM E. JAMES
BY
ATTORNEY

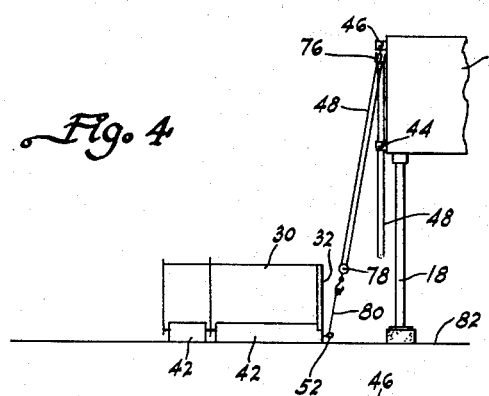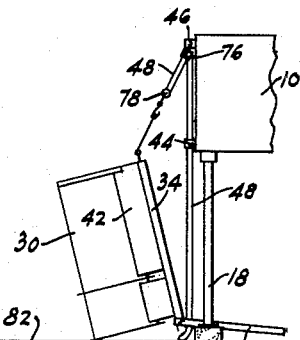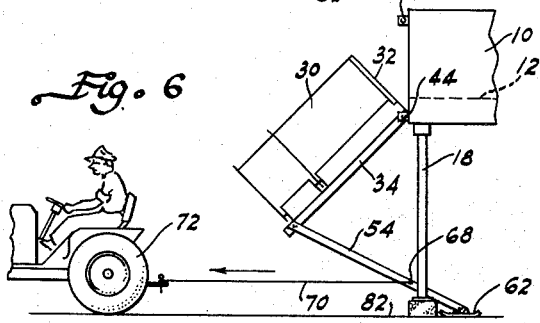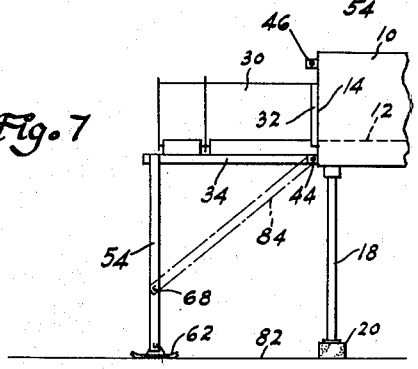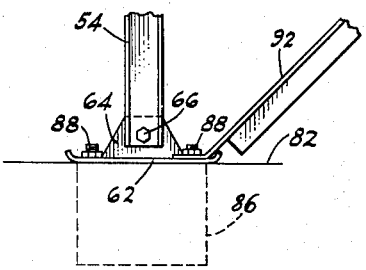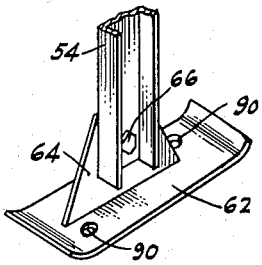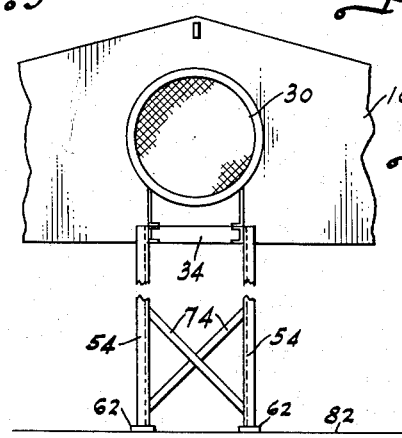

United States Patent Office 3,115,396
Patented Dec. 24, 1963

3,115,396
DRYER UNIT AND ERECTING MECHANISM
William E. James, Witmer, Pa., assignor to Sperry Rand Corporation, New Holland, Pa., a corporation of Delaware
Filed Mar. 21, 1961, Ser. No. 97,274
3 Claims. (Cl. 34—218)

This invention relates to a dryer unit and mechanism for erecting the same in operative relationship to a building to which, more particularly, the drying of agricultural products takes place.

It is generally recognized that many agricultural crops can be improved, not only in regard to storage conditions, by drying the same prior to placing in extensive storage, such as grain crops, but forage crops particularly can be greatly improved relative to nutritive value if the same can be dried immediately following the harvesting thereof. Such forage crops, for example, comprise alfalfa, clover, various grass crops, such as timothy, and others. Considerable difficulty has been experienced, especially in regard to drying alfalfa and other similar crops, wherein the stems of the crop are much thicker and contain a great deal more moisture, by volume, than the relatively thin leaves. If left to dry in the field by natural, atmospheric temperatures, valuable nutrients are leached out, thus considerably lowering the feed value of the crop.

The foregoing difficulties can be avoided by effecting drying by artifical means, and particularly by generating a constant supply of heated gases and passing said heated gases, by means of appropriate mechanism, through various crop products, whether of grain or forage nature. Where substantial capacity is required, the dryer unit must be of large size and the weight thereof is substantial, frequently exceeding a ton or more, whereby it is impossible for normal man power to position such dryer units operatively without the aid of mechanical power means. It will be understood that said dryer units normally comprise, but without restriction thereto, heat generating means, such as oil-fired burners, and blower means capable of moving large quantities of air at substantial pressures rapidly past a heat exchange portion of the unit, so as to heat the air or other gases effectively and then blow the same through the crop products so as to be dried thereby.

Concerning the drying of forage crops particularly, it has been found difficult and unhandy to provide portable dryers, which, for example, might conceivably be combined with or directly follow a mowing machine and moved progressively through a field where a forage crop is being harvested, whereby the crop, immediately upon being cut, is moved through portable drying mechanisms of suitable drying capacity. Instead, it has been found much more satisfactory to devise either permanent or semi-permanent types of drying installations comprising shed-like buildings in which a drying unit is permanently installed, for example, or at least is installed operatively for substantial periods of time. Wagon loads of forage crops, for example, such as bales of hay, alfalfa, and the like, are moved into drying position within such building and covers or shrouds are draped over the loaded wagons and the hot gases from the dryer unit are passed into the covers or shrouds under pressure, the sides and/or bottoms of the wagons preferably having exhaust means therein through which the moisture-laden air or gases escape to atmosphere.

To minimize the need for erecting or installing conductors of adequate size, it has been found that if large conductors or plenum chambers are arranged in the roof area, or upper portions of such shed-like buildings, wagons loaded with the crops to be dried readily are wheeled into the buildings at ground level and shrouds are placed around the wagons and connected to the plenum chamber or conductor means in the upper portion of the building, whereby when the dryer unit is operating, effective and active drying of the crops loaded on the wagons takes place.

The problem of installing dryer units of heavy type in the upper portion of shed-like buildings on a conventional farm has presented serious problems. One suitable means for installing such heavy dryer unit in the upper portion of a shed-like building would be to employ crane means and, while such are readily available, the expense of moving one to the site and operating it is considerably high and more than the average farmer cares to spend, especially since the average farm has a substantial amount of mechanical power available in tractors, and the like, but such tractors usually do not have a crane or derrick means associated therewith.

It is the principal object of the present invention to provide hoisting or erecting mechanism, which not only is operable to elevate a heavy dryer unit into operative position adjacent the upper portion of a shed-like building, for example, but said elevating or erecting mechanism then serves as the supporting means for the dryer unit, either for a temporary or a substantial period of time. Not only is the erecting mechanism capable of installing the dryer unit in operative position in the upper portion of the building, but, by reversing the procedure, said mechanism, likewise, is capable of removing the dryer unit from the building, for example, when it is desired to move the dryer unit to other installations or employ it with other drying mechanism, such as those employed for drying other types of crops, or for replacement and servicing.

Another object of the invention is to provide a method by which a dryer unit of the type to which the present invention pertains may be erected in elevated position adjacent the inlet of means for conducting heated, gaseous products through crops to be dried, and also support the dryer unit in said elevated, operative position, after the same has been erected therein.

Still another object of the invention is to include in such erecting and supporting mechanism elements which are operable by conventional power means normally employed on a farm, such as a tractor, and additional supporting and connecting means of a very simple nature are all that are required to be placed upon the building in order to facilitate the elevation and erection of a dryer unit in an elevated position adjacent the inlet of conducting means by which heated, gaseous products are passed through crops to be dried thereby.

A further object of the invention is to employ a relatively simple type of elevating lever means, preferably having skids on one end thereof for engaging the ground or other supporting surface, relative to which said skid ends of the lever means are moved, incident to elevating the dryer unit, in a pivotal manner, and the lever means ultimately comprise the vertical supports which hold the dryer unit in substantially horizontal, elevated position at the completion of the erecting procedure.

Details of the foregoing objects and of the invention, as well as other objects thereof, are set forth in the following specification and illustrated in the drawings comprising a part thereof.

FIGS. 4 through 7, respectively, show successive steps of the method of elevating and erecting a dryer unit adjacent the inlet of conducting means in a building structure, and also supporting the same ultimately in operative position in communication with the inlet of said conducting means, all in accordance with the principles of the present invention.

FIG. 8 is a perspective view, on a larger scale than employed in FIGS. 4 through 7, of exemplary skid means pivotally connected to the fragmentary lower ends of the supporting strut means of the erecting mechanism of the invention.

FIG. 9 is a fragmentary, side elevation of an exemplary permanent type of installation for supporting the strut means of the erecting and supporting mechanism of the invention.

Figure 2:
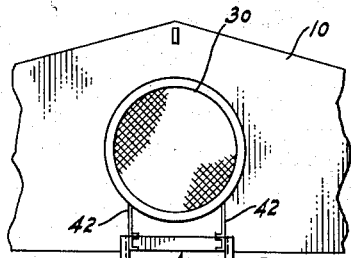
FIG. 2 is a fragmentary, end view of the upper portion of the structures shown in FIG. 1.

FIG. 10 is a fragmentary, end elevation similar to FIG. 2, but showing details of exemplary bracing means for the supporting strut means of the erecting mechanism of the invention.

Figure 1:
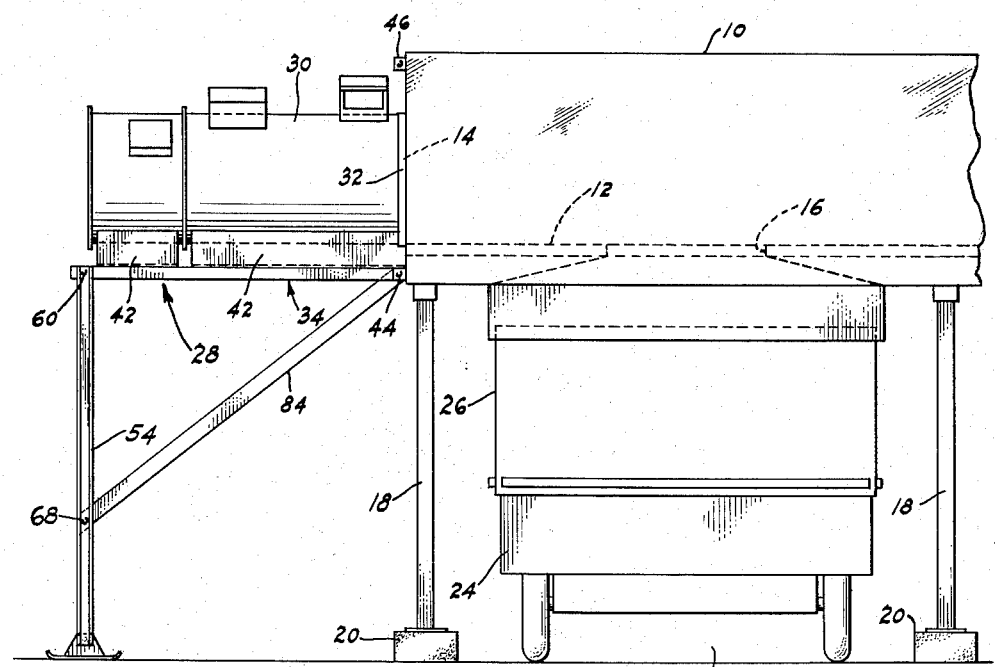
FIG. 1 is a fragmentary, side elevation of one end of an exemplary shed-type building having conducting means in the upper portion thereof and a dryer unit operatively positioned adjacent the inlet of said conducting means by erecting and supporting mechanism embodying the present invention.

Referring to FIG. 1, an exemplary shed-type building 10 is shown, and, in the upper portion thereof, conducting means 12 for heated, gaseous fluids, such as heated air, are mounted. These conducting means may be one of a number of different types and, in accordance with the principles of the present invention, the preferred type is that of the conducting means 12 also comprising a plenum chamber, which, for example, may be composed of subsantially the entire roof structure of the building 10, when enclosed. Said conducting means or chamber is provided at one end with an inlet 14, and one or more outlets 16.

The upper portion of the building 10 is supported by a plurality of suitable upright members 18, which are substantially permanently supported, for example, on appropriate footers 20, the upright supports 18 being spaced apart sufficiently to form bays 22, which, respectively, receive wagons 24 loaded with crops to be dried. A portable, and preferably flexible, type of shroud or cover 26, which may be made of canvas, for example, encloses at least the upper portion of the wagon 24, and the top of the cover 26 is connected to the outlet 16 of the conducting means 12. It will be understood that at least part of the sides and/or the bottom of the wagon 24 are perforated, or otherwise provided with openings through which moisture-laden air discharges to atmosphere after the heated air from the conducting means 12 has passed through the crop load upon the wagon 24, so as to dry the same over an adequate period of time.

The present invention principally is concerned with elevating, erecting, and supporting mechanism generally indicated by the numeral 28. The mechanism 28 is proposes of elevating the dryer unit 30 into the preferably horizontal, operative position thereof shown in FIG. 1, relative to one end of the upper portion of the building 10, whereby the exhaust and 32 of the dryer unit is an direct communication and coaxial with inlet 14 of the conducting means 12 in the building 10.

The dryer unit 30 is of conventional type and includes both heat-generating means, such as an oil-fired burner unit, and fan means for blowing a substantial amount of air continuously past heat-exchange means in the burner unit section of the dryer unit 30. The unit, therefore, is quite large and heavy, whereby it is not possible to raise the same readily or quickly to the elevated position shown in FIG. 1 by conventional, manual means.

In accordance with the principles of the present invention, the elevating, erecting and supporting mechanism 28 includes elongated means constituting a frame unit 34 comprising suitable structural members, such as a pair of spaced channels 36 between which cross members 38 extend, and these members are all connected together appropriately, such as by welding. The channels 36 have suitable connecting means therein, such as holes 40, by which side members 42, for example, on the dryer unit 30, may be connected fixedly to the frame unit 34 by bolts or rivets.

Figure 3:
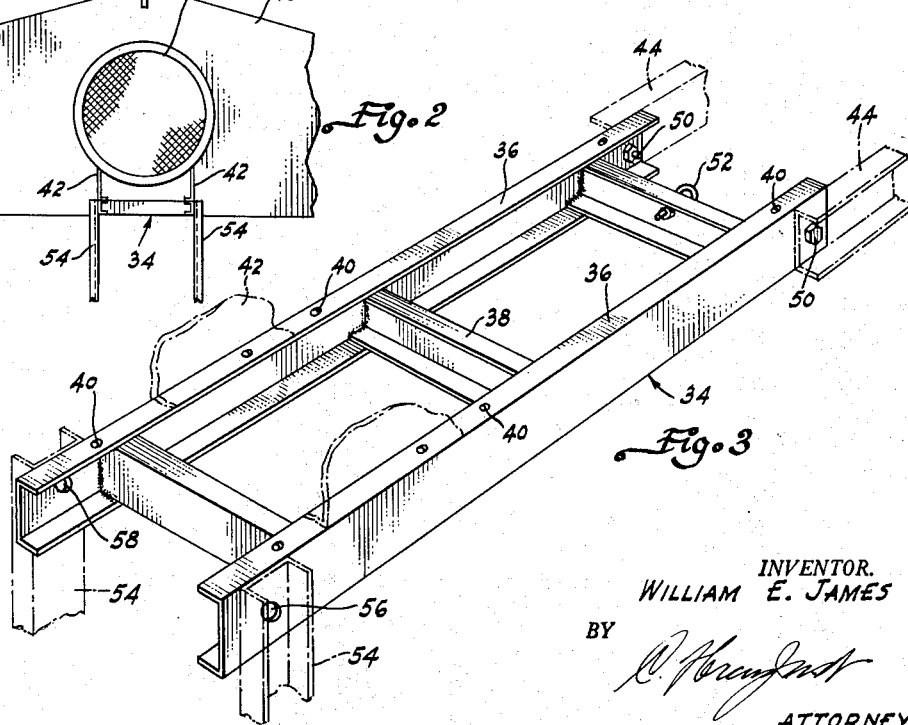
FIG. 3 is an enlarged, fragmentary, perspective view of an elongated frame unit to which the dryer unit is connected for both elevation and support thereby, in accordance with the principles of the invention.

Projecting outwardly from the frame portion of the building 10 adjacent the inlet 14 of the conducting means 12 is a plurality of attaching means 44, which are fixed to the building. These are spaced transversely, as can best seen in FIG. 3. Also projecting from the same end of the upper portion of the building 10 is a supporting projection 46 to which one of the blocks of a block and tackle unit 48, see FIGS. 4 through 7, is connected, such as by the hook of said block. The attaching means 44 preferably are spaced apart in a complementary manner to one end of the channels 36 of the frame unit 34, whereby the ends of said channels fit between the attaching means 44, and axially aligned holes respectively are formed in the channels 36 and attaching means 44 for purposes of receiving pivotal connecting means, such as bolt 50. Also carried by the end of frame unit 34 is hoist-receiving means of any suitable nature, such as an eyebolt 52, shown in FIG. 3. If desired, the eye-bolt 52, or its equivalent may be connected directly to the base portion of dryer unit 30. Said connecting means 52 is for purposes of receiving, for example, the hook of the other block of the block and tackle unit 48 after the dryer unit 30 has been secured to the frame unit 34.

Pivotally connected to the other end of frame unit 34 are, preferably, a pair of transversely spaced, supporting strut members 54, one end of each of the strut members having holes 56 therein, which are complementary to similar holes 58 in the channel members 36, whereby pivotal connecting means, such as either a transverse bar or bolts 60, see FIG. 1, pivotally connect what will be the upper ends of the strut members 54 to what will be the outer end of the frame unit 34 when the frame unit 34 and dryer unit 30 are elevated to the operative position shown in FIG. 1.

The opposite ends of the strut members 54 have skid means pivotally connected thereto, these being best shown in FIGS. 8 and 9, as well as in FIGS. 1 and 4 through 7. According to the preferred construction, said skid means comprise shoes 62, which, preferably, are curved upwardly at opposite ends and have a connecting plate 64 extending vertically therefrom for pivotal connection by bolts 66, for example, to the lower ends of the strut members 54. For convenience and rigidity, the strut members 54 may comprise channel members of suitable size and gauge. The strut members 54 also are provided, preferably intermediate of the ends thereof, with means 68 which are engageable by draft means, such as a pulling cable 70 connectible to a tractor 72, as best shown in FIG. 6.

For purposes of maintaining the strut members 54 in desired, transversely spaced relationship, as shown in FIG. 10, which is a front, elevational view of such strut means, suitable bracing members 74 may extend between the strut members 54 in any suitable manner, such as by being crossed over themselves, as shown in FIG. 10, thereby providing a rigid strut unit which may be engaged by a pulling cable propelled by the tractor 72, without danger of the strut members 54 being pulled toward each other.

In accordance with the principles of the present invention, and by reference to FIGS. 4 through 7, particularly, the preferred process for elevating and erecting the dryer unit relative to the upper portion of the building 10 and then supporting the same in operative relationship with respect to the inlet 14 of conducting means 12 within the upper portion of the building 10, is as follows. One block 76 of the block and tackle unit 48 is connected by its conventional hook to the supporting projection 46 on building 10, as shown in FIG. 4. The other block 78 of the unit 48 is connected either directly to the eyebolt 52 of frame unit 34, or to any other suitable attaching means carried, for example, directly by the side members 42 of the dryer unit 30. If desired, an intermediate sling 80 may be employed.

By operating the chain, cable, or rope of the block and tackle unit 48, as the case may be, either manually or by pulling the same by a tractor, for example, the exhaust end 32 of the dryer unit 30 is elevated substantially to the position shown in FIG. 5, whereby the exhaust end 32 of the dryer unit 30 is uppermost. In the event the frame unit 34 has not previously been connected to the side members 42 of dryer unit 30, said dryer unit is advantageously in a good position to have said frame unit 34 connected thereto while it is so supported. The supporting strut members 54, likewise, are connected at this time to the normally outer end of the frame unit 34. Hoisting of the dryer and frame units 30 and 34 by the block and tackle unit 48 is continued until the uppermost end of frame unit 34 is brought into coincidence with the attaching means 44, whereby pivotal connecting means 50 may be applied, so as to pivotally connect said end of the frame unit 34 to the building 10 for direct support by the attaching means 44 fixed to the supporting frame structure of said building. When this has been accomplished, the block and tackle unit 48 may be relaxed and removed, since it no longer is needed for the installation operation.

Following the pivotal connection of said uppermost end of the frame unit 34 to the attaching means 44, draft means 70 are now connected to means 68 upon the strut members 54, which receive the same, and said draft means are placed under tension by the tractor 72, for example, which is moved slowly outward, away from the building 10, the skid ends of the strut means 54, and particularly the skid members 62 thereon, sliding along the supporting surface 82, which may be either the ground, or a paved surface, for example, whereby continued movement of the tractor 72 will result in the strut members 54 progressively being pulled from the position shown in FIG. 5, through the position shown in FIG. 6, until the strut members 54 finally reach a substantially vertical, supporting position, as shown in FIG. 7.

It is preferred that the strut members 54 be of adequate length, so that when they have reached the vertical position, relative to the supporting surface 82, the dryer unit and frame unit 34 will be substantially horizontal and the exhaust 32 of the dryer unit then will be brought into coaxial engagement with the inlet 14 of the conducting means 12 in the upper portion of the building 10.

The foregoing operations substantially complete the principal installation steps of the method of erecting the dryer unit 30 in operative position relative to building 10. However, if desired, additional refinements may be added, such as by the placement of suitable bracing means 84, shown in FIG. 7, which extend, for example, between the means 68 in the strut members 54 and the frame unit 34. Such brace means will prevent the accidental movement of the strut members 54 from the vertical, operative position thereof shown in FIG. 7.

Where the installation is intended to be of a more permanent nature than that afforded by the simple arrangement shown in FIG. 7, it is contemplated that suitable, permanent type footers 86, such as shown in FIG. 9, may be employed, so as to be disposed within the supporting surface 82, and the upper surface of the footers 86 preferably being flush with surface 82 so as to receive the skid shoes 62. Appropriate anchoring means, such as bolts 88, may be inserted through appropriate holes 90, see FIG. 8, formed in skid shoes 62 and connected to footer 86. Further, relatively permanent type of bracing, such as the fragmentarily illustrated lower end of brace 92, shown in FIG. 9, can be employed as a part of the framing of the building 10, the same utilizing such footer type of arrangement. One of the anchor bolts 88 may extend through the lower extension of brace 92, as shown in FIG. 9, so as to securely position the same and the opposite end of brace 92, which is not shown, may appropriately be connected, for example, to either frame unit 34 or the supporting frame structure of the building 10, such as attaching means 44. Such relatively permanent type of bracing thus is well suited to brace the supporting strut members 54, especially by employing common footers for the braces and struts.

The elevating and erecting structure comprising the present invention, likewise, may be employed to lower and remove a dryer unit 30 from its elevated, operative position, relative to building 10, principally by reversing the procedure described above. It is possible that a pair of tractors conveniently could be employed, at least during the initial portion of the lowering operation, especially while the dryer unit 30 is being lowered from the position shown in FIG. 7, to that shown in FIG. 6. That is, one tractor will be used to initiate the skidding of the lower ends of the strut members 54 from the vertical position toward the building 10 after any brace means 84 or 92 has been disconnected from the structures. It can be appreciated that after the skid shoes 62 have been moved past a vertical, theoretical projection of the center of gravity of the dryer unit 30, the weight of the dryer unit normally would tend to suddenly move the skid shoes into the lower portion of the building between the supports 18, for example, and, in effect, drop the dryer unit 30 to the vertical position, whereby it would be suspended solely from the attaching means 44 on the supporting frame structure of the building 10 and possibly be damaged during such movement.

To avoid this from occurring, either another tractor or block and tackle means should be employed, for example, to more slowly effect lowering of the dryer unit 30 from its elevated, operative position shown in FIG. 7, until the same is suspended substantially vertically downward from the attaching means 44. Then, the block and tackle unit 48 may be installed and used to effect an easing off of the weight of the dryer and frame units 30 and 34 from the pivot bolts 50, whereby the same may be removed, following which the dryer may be lowered to any suitable position upon the supporting surface 82. The unit 30, when convenient during such procedure, is disconnected from the frame unit 34, if desired, whereby it will be in condition to be moved to and mounted in any other similar building or appliance used to dry other types of crops, for example.

While the invention has been described and illustrated in its several preferred embodiments, and has included certain details, it should be understood that the invention is not to be limited to the precise details herein illustrated and described, since the same may be carried out in other ways falling within the scope of the invention as claimed.

I claim:

1. Mechanism for drying crops comprising a drying shed having a plenum chamber in the upper portion thereof, said plenum chamber having at one end an inlet for receiving hot gases and in its lower portion an outlet for the discharge of hot gases, a plurality of spaced uprights for supporting said shed in an elevated position, said uprights being spaced apart sufficiently and of such a height as to provide an open bay under said plenum chamber capable of receiving a loaded farm wagon therein, a conduit connected to said outlet and extending downwardly therefrom to substantially cover a loaded farm wagon in said bay for conducting hot gases from said outlet to said farm wagon, a combination dryer unit and erecting mechanism, said erecting mechanism being operable to raise and support said dryer unit in an elevated position adjacent to said drying shed, said combination comprising an elongated dryer unit having therein a self-contained heater means of substantial weight and having an exhaust means for hot gases at its forward end, an elongated frame member secured to the bottom of said dryer unit, means for pivotally connecting the forward end of said frame member to the shed adjacent to said inlet opening, an elongated strut member having its one end pivotally attached to the rear end of said frame member and its opposite end loosely pivotally attached to shoe members, said shoe members being slidably engageable with a supporting surface alongside the shed and means for connecting a power pulling means to the lower end of said strut member whereby when a substantially horizontal pulling force is applied in a direction outwardly from said drying shed, said shoe members will skid along the aforementioned supporting surface to raise said strut member into a substantially vertical position and thereby elevate the dryer unit into an operative position in which its exhaust means is in register with the inlet opening of said drying shed to discharge heated gases thereinto.

2. The mechanism for drying crops set forth in claim 1 further including a bracing means secured to the lower portion of said strut member to prevent accidental movement thereof from its operative supporting position.

3. The mechanism for drying crops set forth in claim 1 further characterized by said strut member comprising a pair of spaced channel members and bracing means extending between and connected to said channel members to prevent relative lateral movement.

References Cited in the file of this patent

UNITED STATES PATENTS

| | | |
|---|---|---|
| 1,767,157 | Steele | June 24, 1930 |
| 2,183,915 | Killingstad | Dec. 19, 1939 |
| 2,371,561 | Van Patten | Mar. 13, 1945 |
| 2,772,642 | Lindl | Dec. 4, 1956 |

FOREIGN PATENTS

| | | |
|---|---|---|
| 191,609 | Austria | Sept. 10, 1957 |